2,716,594

STABILIZATION OF SULFUR TRIOXIDE WITH METHYL SILICONES

John E. Harris, Jr., Linwood, Pa., Richard N. Smith, Claymont, Del., and Harold G. McCann, West Hyattsville, Md., assignors to Allied Chemical & Dye Corporation, New York, N. Y., a corporation of New York No Drawing. Application December 4, 1952,
Serial No. 324,132

20 Claims. (Cl. 23—174)

This invention relates to the stabilization of liquid sulfur trioxide (substantially pure $SO_3$) and high strength oleums.

At room temperature, liquid sulfur trioxide polymerizes to various degrees. The three generally recognized $SO_3$ modifications melt at approximately 17° C., 32.5° C., and 62° C., respectively. On standing at temperatures below about 27° C., in the presence of even small amounts of moisture, the form melting at about 17° C. rapidly polymerizes to the higher melting forms, and the mass soon becomes solid, melts only under pressure, sometimes requiring temperatures up to 100° C. to effect complete liquefaction. High strength oleums of free $SO_3$ strengths upward of about 80% tend to polymerize in similar fashion, the degree of polymerization depending chiefly upon the $SO_3$ strength of the oleum and temperatures at which the material is stored. In oleums in the lower portions of the $SO_3$ strength range indicated, certain polymers form, the degree of polymerization increases on passage of time, and while the material may not solidify completely, the ultimate mass may be a liquid phase containing in suspension the various solid polymers noted.

In many industrial processes, it is highly desirable to use $SO_3$ in its strongest obtainable form. However, the foregoing characteristics of unstabilized sulfur trioxide and high strength oleums create marked disadvantage relative to the storage, shipment, and use of such materials. While, for example, sulfur trioxide might be shipped in drums or tanks equipped with heating coils, there is involved the first problem of supplying a relatively expensive form of container. Moreover, since heat transfer thru a solid material is poor, the solidified sulfur trioxide in the container can be melted by the user only with considerable difficulty. In addition to this disadvantage, after relatively long periods of standing, a large portion of the sulfur trioxide will have polymerized to the high melting form in which case complete melting can only be effected by heating at high temperature under considerable pressure. To a lesser extent the same disadvantages apply to high strength oleums.

This invention aims to provide stabilized forms of liquid sulfur trioxide or high strength oleums which either do not polymerize to any substantial degree and remain liquid at room temperature, or in which, if polymerization does take place, the polymers formed are readily meltable at moderate temperatures of about 40° C. and below, i. e. temperatures which do not require substantial vaporization of $SO_3$ or use of heating containers capable of withstanding relatively high pressures, as is the case when high temperatures are needed to melt the more refractory types of polymers. The invention also affords methods for accomplishing the foregoing objectives. A further object of the invention is to provide stabilizing agents which are effective in small concentrations, in inhibiting polymerization of $SO_3$ and are easily dispersed in stabilizing quantities in liquid sulfur trioxide and high strength oleums. A further object is to produce stabilized liquid $SO_3$ free of char or other colored products of organic nature.

This invention comprises a liquid $SO_3$, such as condensed $SO_3$ or high strength oleum, stabilized against polymerization and to which methyl silicones have been added as stabilizing agent. It has been discovered that methyl silicones of high or low viscosity i. e. having characteristics from thin liquids through viscous semi-solid form, may be dispersed throughout liquid $SO_3$ in small quantities, by adding the selected methyl silicone to the $SO_3$ liquid and mixing, even at ordinary temperatures and pressures, to obtain a material capable of being handled and stored for extended periods without the production of any great amount of high melting-point polymers. Such materials retain the ability to be completely or substantially completely melted after repetitious freezings and meltings. The amount of methyl silicone required is ordinarily quite small, generally no more and often less than 0.5% by weight of the liquid $SO_3$ or oleum. Satisfactory stability may be obtained with an addition of methyl silicone of the order of 0.02% to 0.5% by weight of sulfur trioxde with a preferred range of 0.05% to 0.2% by weight.

As stated above, oleums of $SO_3$ strength of about 80% and upward tend to polymerize to greater or less extent, depending mostly upon $SO_3$ strength and time and temperature of storage. It has been found that by dispersing our polymeric silicon containing compounds in liquid sulfur trioxide or in high strength oleums of the type indicated, polymerization is inhibited or minimized. Since anhydrous sulfur trioxide tends to polymerize to a lesser degree than does sulfur trioxide containing water (i. e., chemically combined in the form of $H_2SO_4$), and since, from a commercial point of view, it is advantageous to manufacture, store, and ship sulfur trioxide as such (in substantially anhydrous form) or as an oleum containing not less than 99.4% free $SO_3$, particular embodiments of our invention are directed to stabilization of these high $SO_3$ content materials.

The preferred treating agents which we have found to be of value in the stabilization of sulfur trioxide and high strength oleums include the methyl silicones, which are methylated or methoxylated polymeric forms of siloxane or disiloxane, characterized by the nucleus $\mathrm{\{Si-O\}}_n$ Si, where $n$ is 1 or more, and in which the valence bonds of the silicon atoms not satisfied by methyl or methoxy groups are satisfied by hydrogen.

Among the particular chemical entities recognizable as being effective to produce efficacious results are those having the general formula:

$$R'[R''_2SiO]_n SiR'''_3$$

where $n$ is between 1 and about 900 and R', R'', R''' are methyl or methoxy groups or hydrogen, this polymer being a methyl silicone. These straight-chain methyl silicones will preferably contain from 1.0 to 1.6 methyl groups per silicon atom in the molecule.

A second chemical species of methyl silicone polymers capable of being used, is that embracing the cyclic compounds $[R'R''SiO]_n$, wherein $n$ is between 3 and about 900. R' and R'' may be either hydrogen or a methyl or methoxy group.

Other methyl silicones characterized by various cyclic, linear, or combinations of cyclic and linear linkages and/or cross-linkages also fall within the scope of this invention.

The methyl polysiloxanes, and in particular, the preferred pure trimethyl end-blocked siloxanes, either individually or in mixtures, are found to be effective either in liquid or in semi-solid (grease) form.

Highly effective liquid trimethyl end-blocked polymeric siloxanes (silicones) include fluids having physical properties within the following ranges:

| Viscosity, cs. at 25° C. | Molecular Weight | Density |
|---|---|---|
| 0.65 | 162 | 0.758 |
| 2.0 | 384 | 0.868 |
| 10 | 1,200 | 0.937 |
| 20 | 1,900 | 0.947 |
| 100 | 6,700 | 0.965 |
| 350 | 15,800 | 0.969 |
| 1,000 | 26,400 | 0.970 |
| 2,000 | 35,000 | 0.970 |
| 12,500 | 63,400 | 0.970 |

The materials having viscosities of 0.65 cs. and 2.0 cs. are essentially pure compounds, hexamethyldisiloxane, $(CH_3)_3SiOSi(CH_3)_3$, and dodecamethylpentasiloxane, $(CH_3)_3Si[OSi(CH_3)_2]_4CH_3$. The other materials are mixtures of silicone polymers containing various higher polymers or trimethyl end-blocked dimethyl siloxanes. Other fluids having properties intermediate to those listed are also available and effective. The fluids may be generally described as being the polymeric forms either pure or in mixtures, of the series beginning with monomeric hexamethyldisiloxane.

The quantity of treating agent employed depends largely upon the degree of stabilization desired and the amount of water present in the material. In general, the larger the amount of the agent added, the greater is the stabilizing effect thereof; and, considering anhydrous sulfur trioxide (containing substantially no water) as a starting point, the greater the amount of water, the greater is the tendency for $SO_3$ polymers to form, and the greater will be the amount of stabilizer required to effect a given degree of stabilization.

For substantially anhydrous sulfur trioxide, adequate stabilization may be obtained by employing the treating agent in concentrations of from about 0.02% to 0.5% by weight of the sulfur trioxide, with the preferred concentrations being from 0.05% to 0.2% by weight.

Materials stabilized in accordance with the invention do not polymerize to any appreciable extent (i. e. less than 2-3%) and remain substantially in liquid form when brought at room temperature, even though stored for extended periods at temperatures of 0° C. or less. As indicated, any solid $SO_3$ formed on freezing, is readily reconverted to liquid monomeric $SO_3$ by warming to 40° C. or below. Hence products of this type are acceptable in nearly all commercial applications.

It is usually desirable to avoid dilution of the sulfur trioxide and to maintain $SO_3$ strength at the maximum value possible. Accordingly, it is preferred to utilize treating material in amount not greater than about 0.5% by weight. It is also found advisable in practice to use liquid methyl polysiloxanes since they are easily introduced into and dispersed within the body of liquid sulfur trioxide. Furthermore, upon ultimate volatilization of the liquid $SO_3$ as it is used in the particular process, the residue which remains in the tank, can be conveniently drained or flushed out. Under most conditions this is a substantial advantage over the use of solid compounds as stabilizers. Thus the liquid or highly dispersed polysiloxanes herein disclosed have this added advantage.

The preferred products of the invention, i. e., the inhibited sulfur trioxide or oleums of $SO_3$ strength not less than 99.4% which do not polymerize to any appreciable extent preferably should be kept sealed off from contact with air, since a small amount of moisture causes such products to lose some stability and to form low melting polymers.

Although stabilization of sulfur trioxide may be effected over a wider range of water content, the most efficacious results are obtained when the amount of water in the $SO_3$ is less than 0.1% of water by weight or its equivalent 0.56% of sulfuric acid. Under these conditions, the stabilized liquid sulfur trioxide may be stored for long periods without polymerization.

The sulfur trioxide or oleum to be treated may be obtained from any suitable source. For example, substantially 100% $SO_3$ may be obtained by distilling say 30% oleum under conditions to avoid vaporization of $H_2SO_4$, and condensing the $SO_3$ at temperature, say 20–30° C., at which liquid sulfur trioxide has sufficiently low vapor pressure. Similarly, liquid sulfur trioxide may be obtained from the dry mist-free, say 10%, $SO_3$ exiting a catalytic $SO_2$ oxidation operation, by compressing the gas to about 160–170 lbs. per square inch, and cooling the compressed gas to 20–25° C., under which conditions about 70% of the $SO_3$ may be liquefied and recovered as substantially 100% liquid sulfur trioxide.

The following examples illustrate the practice of our invention, the parts being by weight.

*Example I.*—0.05% by weight of liquid methyl silicone oil of 100 centistokes viscosity, was added to anhydrous liquid sulfur trioxide and the mixture was mildly agitated at substantially room temperature. The resulting mixture was stored at 0° C. and warmed to room temperature at intervals, to melt the frozen crystals of $SO_3$. In the following tabulation, column A represents the time at which the liquid was allowed to melt, and column B notes the amount of polymer present (the unmelted material at room temperature) in the sample:

| A | B |
|---|---|
| | Percent |
| 0 days | 0 |
| 3 days | 0 |
| 14 days | 1–2 |
| 24 days | 2–3 |
| 41 days | 2–3 |

The treated sample was thus frozen and melted 4 times during the period of 41 days. It still melted substantially completely, showing only a faint trace (2–3%) of unmelted needle-like crystals, characteristic of the polymer. This is satisfactory for commercial use. An untreated sample would be 50% polymerized in a period of one day.

*Example II.*—0.25% by weight of liquid methyl silicone oil of 5 centistokes viscosity, was added to anhydrous liquid sulfur trioxide and the mixture was mildly agitated at substantially room temperature. The resulting mixture was stored at 0° C. and intermittently allowed to warm to room temperature to melt the frozen $SO_3$ crystals. As above, column A lists the number of days frozen before each thawing, and column B noted the amounts of unmelted polymer on melting the sample at room temperature:

| A | B |
|---|---|
| | Percent |
| 0 days | 0 |
| 3 days | 0 |
| 14 days | 1 |
| 24 days | 2 |
| 41 days | 2 |

At the end of 41 days the treated sample of sulfur trioxide was thus still substantially free of any trace of polymer viz. needles remaining unmelted after allowing the temperature of the sulfur trioxide to rise from below the freezing point to that of the room. In comparison an untreated sample would be approximately 98% polymerized long before the end of this period.

*Example III.*—Into separate 16 ounce ampoules of anhydrous liquid sulfur trioxide, silicone stopcock grease was added respectively in amounts by weight of 0.10%, and 0.20% of the sulfur trioxide. The samples were frozen solidly and then placed in a warm place to melt. Upon melting and refreezing several times over a period of 19 days, the following percentages of polymer were observed in the samples.

| Percent Silicone | Percent Polymer |
|---|---|
| 0.10 | 2 |
| 0.20 | 1 |

While we do not intend to limit ourselves to any particular theory, we believe that the organic stabilizers of this invention when added to oleum or sulfur trioxide, form dispersions or solutions of active stabilizing agent in the material stabilized. The ease of incorporation and dispersion of inhibitor in the oleum or sulfur trioxide affords a marked advantage of the present invention, in that no further processing of the mixed $SO_3$ material and stabilizing agent is required.

The treating agent used may be added directly to the liquid to be stabilized and dispersed by agitation, or in the case of stabilizing substantially 100% sulfur trioxide, the vaporous $SO_3$ conveniently may be condensed in a closed vessel in which the treating material to be used has been previously placed.

We claim:

1. The method of stabilizing material selected from the group consisting of sulfur trioxide and oleum of free $SO_3$ strength such that $SO_3$ polymers tend to form, which comprises incorporating therewith in amount sufficient to stabilize the free $SO_3$ content thereof but insufficient to dilute substantially said free $SO_3$ content, a polymeric siloxane substituted by a radical from the group consisting of methyl and methoxy, in which all silicon valences unfilled by said radical are satisfied by hydrogen.

2. The method of stabilizing material selected from the group consisting of sulfur trioxide and oleum of free $SO_3$ strength such that $SO_3$ polymers tend to form, which comprises incorporating therewith in amount sufficient to stabilize the free $SO_3$ content thereof but insufficient to dilute substantially said free $SO_3$ content, a methyl substituted polymeric siloxane compound of the formula $R'[R''_2SiO]_nSiR'''_3$, in which $R'$, $R''$ and $R'''$ are selected from the group consisting of methyl, methoxy and hydrogen, and $n$ is an integer from 1 to about 900.

3. The method of stabilizing material selected from the group consisting of sulfur trioxide and oleum of free $SO_3$ strength such that $SO_3$ polymers tend to form, which comprises incorporating therewith in amount sufficient to stabilize the free $SO_3$ content thereof but insufficient to dilute substantially said free $SO_3$ content, a trimethyl end-blocked siloxane polymer in which all unfilled silicon valences are satisfied by a member of the group consisting of methyl, methoxy and hydrogen.

4. The method of stabilizing material selected from the group consisting of sulfur trioxide and oleum of free $SO_3$ strength such that $SO_3$ polymers tend to form, which comprises incorporating therewith in amount sufficient to stabilize the free $SO_3$ content thereof but insufficient to dilute substantially said free $SO_3$ content, a trimethyl end-blocked dimethyl siloxane polymer.

5. The method of stabilizing material selected from the group consisting of sulfur trioxide and oleum of free $SO_3$ strength such that $SO_3$ polymers tend to form, which comprises incorporating therewith in amount sufficient to stabilize the free $SO_3$ content thereof but insufficient to dilute substantially said free $SO_3$ content, a methyl substituted polymeric siloxane compound of the formula $$R'[R''_2SiO]_nSiR'''_3$$

in which $R'$, $R''$ and $R'''$ are selected from the group consisting of methyl, methoxy and hydrogen, and $n$ is an integer from 1 to about 900, and in which there are 1.0 to 1.6 methyl groups per silicon atom.

6. The method of stabilizing material selected from the group consisting of sulfur trioxide and oleum of free $SO_3$ strength such that $SO_3$ polymers tend to form, which method comprises incorporating therewith in amount sufficient to stabilize said material but insufficient to dilute substantially said free $SO_3$ content, a polymer containing compounds of the formula $CH_3[(CH_3)_2SiO]_nSi(CH_3)_3$, where $n$ is 1 to about 900.

7. The method of stabilizing material selected from the group consisting of sulfur trioxide and oleum of free $SO_3$ strength such that $SO_3$ polymers tend to form, which method comprises incorporating therewith in amount sufficient to stabilize said material but insufficient to dilute substantially said free $SO_3$ content, a polymeric organosiloxane in which the only substituents attached to the silicon atoms are selected from the group consisting of $CH_3O-$, $CH_3-$ and H.

8. The method of stabilizing material selected from the group consisting of sulfur trioxide and oleum of free $SO_3$ strength such that $SO_3$ polymers tend to form, which comprises incorporating therewith in amount sufficient to stabilize the free $SO_3$ content thereof but insufficient to dilute substantially said free $SO_3$ content, a polymeric siloxane compound of grease-like consistency containing as substituent a radical selected from the group consisting of methyl and methoxy in which all silicon valences unfilled by said radical are satisfied by hydrogen.

9. The method of stabilizing material selected from the group consisting of sulfur trioxide and oleum of free $SO_3$ strength such that $SO_3$ polymers tend to form, which method comprises incorporating therewith in amount sufficient to stabilize said material but insufficient to dilute substantially said free $SO_3$ content, a polymer compound of the formula $[CH_3RSiO]_n$ where R is selected from the group consisting of $CH_3O-$, $CH_3-$ and $H-$, and $n$ is 3 to about 900.

10. The method of stabilizing material selected from the group consisting of sulfur trioxide and oleum of free $SO_3$ strength such that $SO_3$ polymers tend to form, which method comprises incorporating therewith in amount sufficient to stabilize said material but insufficient to dilute substantially said free $SO_3$ content, a polymer containing compounds of the formula $[(CH_3)_2SiO]_n$ where $n$ is integral and greater than 2.

11. The method of stabilizing material selected from the group consisting of sulfur trioxide and oleum of $SO_3$ strength such that $SO_3$ polymers tend to form, which method comprises incorporating with said material a liquid trimethyl end-blocked siloxane polymer in which all unfilled silicon valences are satisfied by a member of the group consisting of methyl, methoxy and hydrogen and having viscosity in the range of 0.65 to 12,500 centistokes at 25° C. in an amount less than 0.5% by weight of said material.

12. The method of stabilizing material selected from the group consisting of sulfur trioxide and oleum of free $SO_3$ strength such that $SO_3$ polymers tend to form, which method comprises incorporating with said material hexamethyl disiloxane, in an amount less than 0.5% by weight of said material.

13. The method of stabilizing sulfur trioxide containing less than 0.1% by weight of water which method comprises incorporating with said material in an amount greater than 0.02% and less than 0.5% by weight of said material a polymeric siloxane substituted by a radical selected from the group consisting of methyl and methoxy in which all silicon valences unfilled by said radical are satisfied by hydrogen.

14. The method of stabilizing sulfur trioxide containing less than 0.1% by weight of water which method comprises incorporating with said material a trimethyl end-blocked polymeric siloxane in which all available silicon valences are satisfied by a member of the group consisting of methyl, methoxy and hydrogen, in an amount greater than 0.02% and less than 0.5% by weight of said material.

15. A liquid composition containing free polymerization-resistant sulfur trioxide in polymerizable concentration, comprising a material selected from the group consisting of sulfur trioxide and oleum of free $SO_3$ strength such that polymers tend to form, to which has been added a siloxane polymer substituted by a radical selected from the group consisting of methyl and methoxy in which all silicon valences unfilled by said radical are satisfied by hydrogen.

16. A composition as set forth in claim 15 having a water content of less than about 0.1% by weight.

17. A liquid composition containing free polymerization-resistant sulfur trioxide in polymerizable concentration comprising a material selected from the group consisting of sulfur trioxide and oleum of free $SO_3$ strength such that polymers tend to form, to which has been added a methyl substituted polymeric siloxane compound of the formula $R'[R''_2SiO]_nSiR'''_3$, in which $R'$, $R''$ and $R'''$ are selected from the group consisting of methyl, methoxy and hydrogen, and $n$ is an integer from 1 to about 900.

18. A liquid composition containing free polymerization-resistant sulfur trioxide in polymerizable concentration comprising a material selected from the group consisting of sulfur trioxide and oleum of $SO_3$ strength such that polymers tend to form, to which has been added a liquid trimethyl end-blocked siloxane polymer in which all available silicon valences are satisfied by a member of the group consisting of methyl, methoxy and hydrogen and having a viscosity of 0.65 to 12,500 centistokes at 25° C.

19. A liquid composition containing free polymerization-resistant sulfur trioxide in polymerizable concentration comprising a material selected from the group consisting of sulfur trioxide and oleum of free $SO_3$ strength such that polymers tend to form, to which has been added hexamethyl disiloxane.

20. A liquid composition containing free polymerization-resistant sulfur trioxide in polymerizable concentration comprising a material selected from the group consisting of sulfur trioxide and oleum of free $SO_3$ strength such that polymers tend to form, to which has been added a trimethyl end-blocked dimethyl siloxane polymer.

References Cited in the file of this patent

UNITED STATES PATENTS

| | | |
|---|---|---|
| 2,386,441 | Daudt | Oct. 9, 1945 |
| 2,437,204 | McGregor et al. | Mar. 2, 1948 |
| 2,459,387 | McGregor et al. | Jan. 18, 1949 |
| 2,469,888 | Pentnode | May 10, 1949 |

OTHER REFERENCES

Post: Silicones and Other Organic Silicon Compounds (Reinhold Publishing Corp.), N. Y. 18, N. Y., 1949, pages 7, 33, 34 and 59.

Thorpe's Dictionary of Applied Chemistry, 4th ed., vol. X, Longmans, Green and Co., New York, N. Y., page 747.